Sept. 9, 1952  E. JELLINEK  2,610,232
PHOTOELECTRIC DETECTOR
Filed May 5, 1950  2 SHEETS—SHEET 2
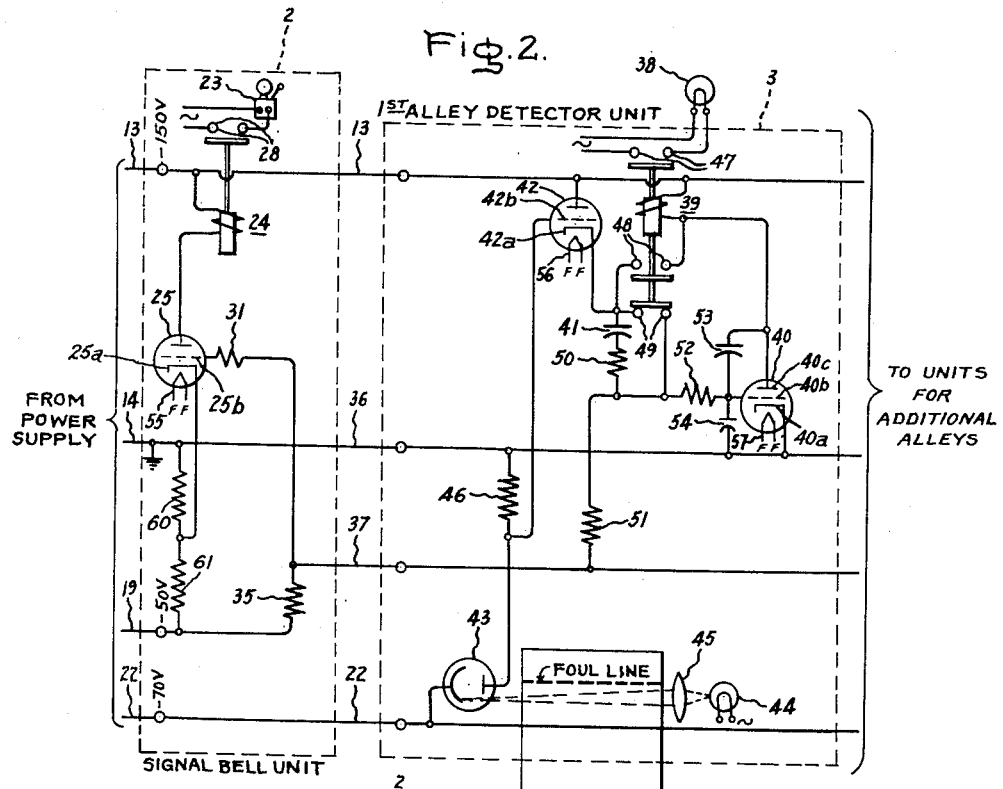
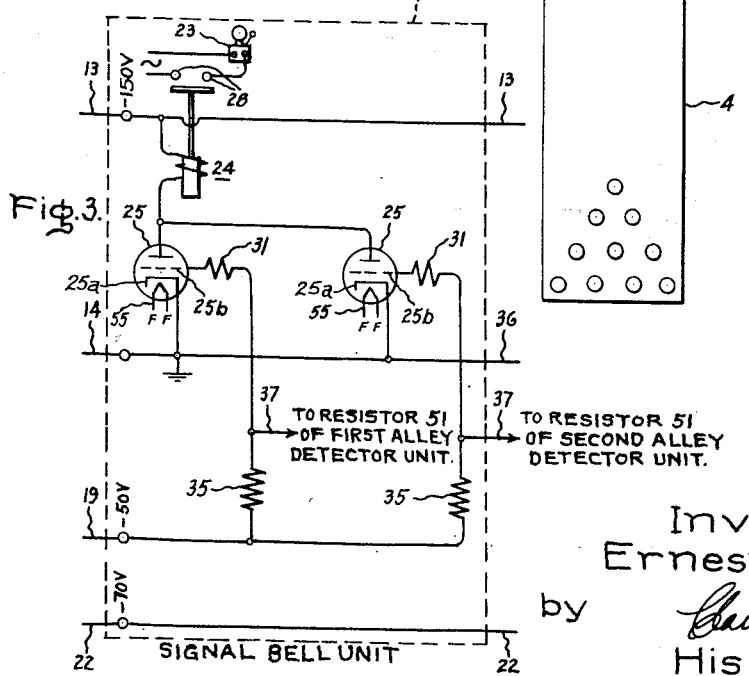
Inventor:
Ernest Jellinek,
by Claude A. Mots
His Attorney.

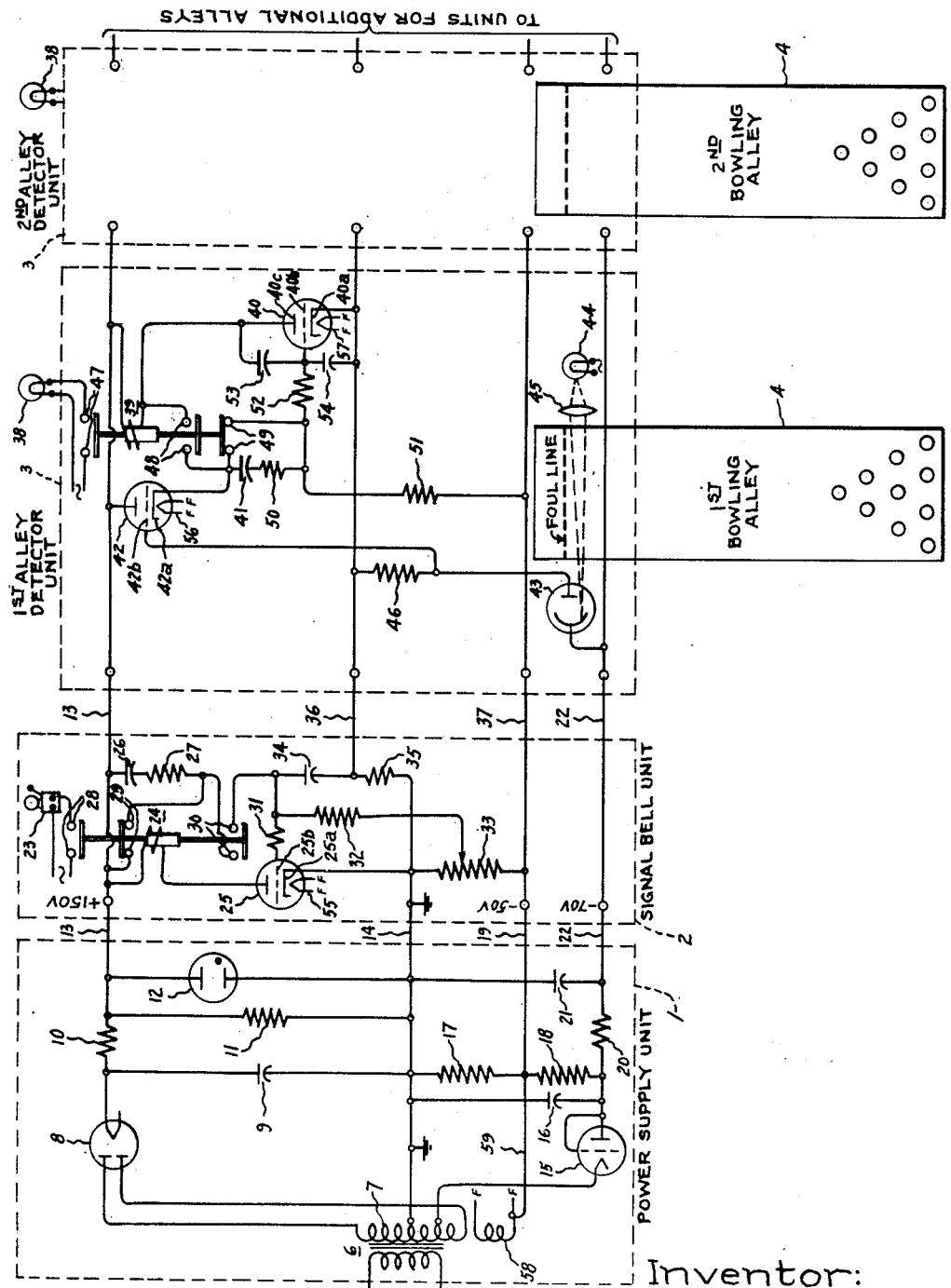

Patented Sept. 9, 1952

2,610,232

UNITED STATES PATENT OFFICE 2,610,232

PHOTOELECTRIC DETECTOR

Ernest Jellinek, Schenectady, N. Y., assignor to General Electric Company, a corporation of New York Application May 5, 1950, Serial No. 160,177

5 Claims. (Cl. 175—321)

This invention relates to photoelectric detection and amplification apparatus, and more particularly such apparatus which may be conveniently employed as a foul detector for bowling alleys.

It is generally desired to maintain the distance of all bowlers from the bowling pins at a specified minimum in order to assure equal opportunity for accuracy for every player. For this purpose a so-called "foul line" is generally marked at the end of the alley from which the bowling ball is delivered. No player is supposed to cross this foul line as the ball is delivered. Since disputes may arise between players as to whether the foul line has been crossed or not, it is desirable to have some automatic means for detection of a foul. The photoelectric cell has been found quite satisfactory for this purpose. However, in order to obtain an indication from the photoelectric cell to show that the foul line has been crossed, it is necessary to have means for amplifying the signal of the photocell to operate some signaling means.

It is therefore an object of this invention to provide an improved photoelectric foul detector apparatus including an improved and simplified means for amplifying the photoelectric signal and operating a signal device.

The American Bowling Congress has specified that such a foul detector apparatus shall ring a signal bell for from one to two seconds and illuminate a signal light at the alley where the foul is committed for from ten to fifteen seconds. One signal bell may be used for a large number of alleys, but a signal light must be used for each alley.

It is therefore an object of this invention to provide a foul detector apparatus which will satisfy the above specifications but which is at the same time simple, economical, reliable and requiring a minimum of adjustment at the time of installation and during use.

During use the voltage supplied to the apparatus may fluctuate and the illumination on individual photocells may fluctuate. These fluctuations are likely to cause variations in the operation of prior apparatus of this description.

It is therefore a further object of this invention to provide an apparatus of the above description which will operate reliably over relatively wide ranges of fluctuation of line voltages and steady state illumination.

It is inevitable that where a light beam which is focused upon a photocell is placed so as to be interrupted by a bowler's foot which crosses the foul line, it may also be interrupted by the passage of the bowling ball as the ball is delivered. Delivery of the ball may therefore interrupt the beam on many occasions where no foul occurs.

It is therefore a further object of the invention to provide an apparatus of the above description which will not be operated by the brief interception of the light beam due to passage of the bowling ball, but which will be operated by passage of a portion of the bowler's body across the foul line.

In carrying out the objects of this invention an apparatus which may be employed includes a suitable power supply unit, a signal bell unit, and an individual alley detector unit for each of the bowling alleys to be equipped. A portion of the power which is supplied to each of the alley detector units passes through the signal bell unit in such a way that, when an alley detector unit is actuated by the occurrence of a foul, a greater power supply flow to the actuated alley detector unit causes a change in voltage in a portion of the signal bell unit to actuate a signal bell.

For a more complete understanding of the invention reference should be had to the following specification and the accompanying drawings, in which Fig. 1 is a schematic diagram of one embodiment of the apparatus of the invention, Fig. 2 is a schematic diagram of a portion of the apparatus showing an alternative embodiment, and Fig. 3 is a schematic diagram showing another alternative embodiment.

Referring more particularly to Fig. 1, there is shown a power supply unit 1, a signal bell unit 2, and one or more alley detector units 3 for the respective bowling alleys 4. Any reasonable number of alley detector units may be employed in this apparatus in conjunction with one signal bell unit. In practice, this number has generally been limited to sixteen, but a larger number could be used. Since all of the units 3 are substantially identical, in the interest of simplicity and clarity in this specification the detector unit for only the first alley is shown and described in detail.

Electrical power may be supplied from a suitable source to the incoming terminals 5 of the power supply unit 1 and thus to a power transformer 6 within the unit. The secondary winding 7 of transformer 6 may be connected to a full wave rectifier 8, the output of which may be connected through a suitable filter such as that including capacitor 9 and resistors 10 and 11, and a voltage regulating glow tube 12 to provide a plate supply voltage of a suitable magnitude such as 150 volts at connection 13. This voltage is positive with respect to the ground connection at 14 from the center tap of transformer winding 7.

Negative grid bias voltages and the plate supply voltage for the phototubes may be obtained by a second rectifier 15, powered from a tap on transformer winding 7, the output of which may be suitably filtered by a capacitor 16 and resistors 17 and 18. A portion of the voltage available from this source is taken at 19 for a grid bias supply voltage of approximately minus 50 volts from the mid-connection of resistors 17 and 18. The full voltage from rectifier 15 may be further filtered by the combination of resistor 20 and capacitor 21 for a phototube plate supply of approximately minus 70 volts available at connection 22.

The signal bell unit 2 includes a signal bell 23, a bell actuating relay 24, a grid controlled electron discharge device 25 for energizing relay 24 and a capacitor 26 for timing the signal bell operation. A resistor 27 is provided in series with capacitor 26 for limiting the capacitor current. The relay 24 is provided with main signal bell circuit contacts 28 and auxiliary contacts 29 and 30 for changing the connections to capacitor 26 upon actuation of the signal bell circuit. The control grid 25b of discharge device 25 is supplied with a suitable bias voltage through resistors 31 and 32 by means of a potentiometer 33 which is connected between ground and the minus 50 volt grid bias voltage supply. The grid is controlled by a circuit including a capacitor 34 and a resistor 35 in a manner which will be described below.

Power is available to the alley detector units 3 from the signal bell unit 2 by means of connections which are respectively designated at 13, 36, 37 and 22. Each of the alley detector units 3 is associated with a separate bowling alley 4, and connected to a suitable signaling device such as light 38. In each unit 3 there is provided a relay 39 for energizing signal light 38, a grid controlled electron discharge device 40 for energizing the relay 39, a timing capacitor 41 for timing a period of energization of relay 39, a second grid controlled electron discharge device 42 for controlling the energization of device 40, and a phototube 43 for controlling the energization of device 42. The phototube 43 is normally illuminated from a source such as a lamp 44. The illumination may be directed to the phototube by means such as a condensing lens 45. This directed beam of light preferably crosses the bowling alley in the vicinity of the foul line. It is understood that the light beam may cross and recross the foul line a number of times by use of reflective mirrors or prisms (not shown), in order to afford the opportunity for interception of the light beam over a larger area than could be covered by a single crossing.

The illumination normally falling on phototube 43 from light source 44 causes the tube to be conductive by reason of the plate voltage appearing across the tube between connections 36 and 22, the phototube current being limited by a series resistor 46. The phototube current causes a voltage drop across resistor 46 which holds the control grid of discharge device 42 at a substantial negative voltage, thereby preventing conduction by discharge device 42.

Relay 39 is equipped with main contacts 47 for closing a circuit to signal light 38 and auxiliary contacts 48 and 49 for changing the connections on capacitor 41. The currents in capacitor 41 are limited by a series connected resistor 50. The cathode 42a of device 42 is normally maintained at a substantially negative voltage by means of the connection through relay contacts 49 which also shunts capacitor 41 and through a cathode follower resistor 51, which is connected to the negative 50-volt source supplied by connection 37. This negative bias voltage is also supplied to the grid 40b of device 40 through a grid resistor 52.

If a foul is committed, interrupting the beam of light from source 44 to phototube 43, the phototube current decreases and the voltage drop across resistor 46 decreases which raises the potential of the control grid 42b of the device 42 to cause a plate current in device 42. This current creates a voltage drop in cathode follower resistor 51 which raises the potential of the control grid 40b of device 40 causing a plate current in device 40. The coil of relay 39 is thus energized by device 40 closing contacts 47 and illuminating the signal light 38. Relay contacts 48 are likewise closed and contacts 49 opened. The shorting connection across capacitor 41 is thereby broken by the contacts 49, and the uncharged capacitor 41 is connected through contacts 48 and relay coil 39 to the positive supply connection 13. The grid 40b of device 40 is thereby connected to the positive supply connection 13 through the capacitor 41, and device 40 will therefore remain conductive, holding relay 39 picked up, and signal light 38 on, until capacitor 41 charges through the charging path including the winding of relay 39, contacts 48, the capacitor itself, resistor 50, and cathode bias resistor 51 to the negative bias connection 37 and the parallel charging path including resistor 52 and grid 40b to cathode 40a to connection 36. The resistances of cathode bias resistor 51 and grid resistor 52 are large in comparison to the combined resistance of resistor 50 and the winding of relay 39, so that the initial connection of capacitor 41 in the circuit establishes a definite positive voltage on grid 40b. Phototube 43 is isolated from direct connection to capacitor 41 by discharge device 42.

As capacitor 41 gradually charges, the potential of grid 40b will gradually decrease and then go negative, because of the negative grid bias voltage derived from connection 37 through cathode follower resistance 51, to thereby cut off device 40. When device 40 ceases to be conductive the relay 39 is again de-energized and the signal light 38 is thus switched off by the opening of relay contacts 47. Thus the signal light 38 is illuminated for a predetermined period of time after the foul is committed and this period is preferably that specified by the American Bowling Congress, as mentioned above, at from ten to fifteen seconds. This "on" period is determined by proper selection of capacitor 41 and the resistors 50, 51 and 52 which comprise main charging paths for capacitor 41 and thereby determine the charging time. Upon de-energization, relay contacts 49 close and discharge capacitor 41 through resistor 50, and reconnect grid 40b to cathode of 42a so that relay 39 is again responsive to the light condition of the phototube.

The bowling ball, as it passes through the beam of light, will momentarily interrupt the illumination of the phototube 43. However, this interruption in illumination should not operate the foul detector since no foul has been committed. A foul is therefore distinguished from passage of the ball in terms of the relative periods of interruption of the light beam, the interruption by the ball being relatively brief, and the interruption by the player himself in committing the foul being relatively longer. A suitable time delay in the operation of the circuit is provided to distinguish between these two conditions by means of capacitor 53 which is connected between grid 40b and anode 40c of the discharge device 40. This time delay is operative upon initial conduction in the plate circuit of discharge device 40. Such initial conduction causes a voltage drop across the relay winding of coil 39, and this voltage drop is in effect subtracted from the 150 volt plate supply which is connected at 13 through the relay winding to anode 40c of device 40. Since anode 40c and grid 40b are interconnected by capacitor 53, such a lowering of the plate voltage is initially transmitted to grid 40b in almost its full magnitude to thereby depress the voltage on grid 40b and limit the conduction in discharge device 40 until capacitor 53 charges. A grid filter capacitor 54 may also be provided.

The time delay obtainable by means of capacitor 53 may be alternatively obtained without capacitor 53 by enlarging grid capacitor 54 so that an appreciable time is required to change the voltage of control grid 40b upon application of a new voltage to the resistor 52. Operation of this alternative time delay may also be improved by reducing the amount of negative grid voltage available at connection 37 from the minus fifty volts to the order of minus twelve volts. Since this alternative time delay method involves only a minor change in the circuit, that is, the elimination of capacitor 53, no separate diagram for this alternative is shown.

As discharge device 40 becomes conductive, the current supplied to the cathode 40a through connection 36 causes a voltage drop across resistor 35 in the signal bell unit 2. This voltage is connected through the capacitor 34 to cause a rise in the potential of control grid 25b of electron discharge device 25, causing device 25 to become conductive. The plate curent of device 25 then energizes relay 24, closing relay contacts 28 to energize signal bell 23. At the same time, relay contacts 29 open to disconnect a discharging circuit for capacitor 26, and relay contacts 30 close to connect capacitor 26 through resistor 27 to the grid 25b of discharge device 25. Since capacitor 26 is initially discharged, this connection applies a positive voltage through capacitor 26 from the plate voltage supply connection 13 to the grid 25b, causing this grid to remain positive and device 25 to remain conductive until capacitor 26 charges through the path afforded by resistance 27, relay contacts 30, resistance 32, and potentiometer 33. An appropriate period of operation of relay 24 is thereby obtainable for a charging period of capacitor 26 independently of the duration of the signal derived from operation of device 40. This period is determined by the capacity of capacitor 26 and the resistance values of charging path resistances 27, 31, 32 and 33, and is preferably the one to two seconds specified by the American Bowling Congress.

In the modification shown in Fig. 2, the resistor 35 has been moved in signal bell unit 2 from the circuit between ground connection 14 and connection 36 to the circuit between input connection 19 and output connection 37. A signal is no longer derived therefore by the grid 25b of the device 25 by reason of the cathode currents of cathode 40a of device 40 in the alley detector unit 3. Instead, resistance 35 is now in a charging circuit of timing capacitor 41 of the detector unit 3. Thus a portion of the positive voltage which is applied to grid 40b of device 40 during the timed period of signal light actuation obtained by the timing capacitor 41 is also applied to grid 25b of device 25. The relative values of resistor 35 in the signal bell unit 2 and resistor 51 in the detector unit 3 may be so chosen that the desired time delay causing signal bell operation of from one to two seconds may be obtained from the detector unit timing capacitor 41. Thus the capacitor 41 times the duration of operation of both signal light 38 and signal bell 23 and the relatively expensive capacitor 26 may be eliminated. Also, it will be seen that in Fig. 2 resistor 27, relay contacts 29 and 30, resistor 32, potentiometer 33, and capacitor 34 have been eliminated, thus further simplifying the signal bell unit 2.

In order to have the Fig. 2 modification operate correctly for a number of alley detector units, without causing unwanted operation of discharge devices 40 in detector units where a foul has not occurred, due to the voltage at connection 37 which is intended only to operate signal bell unit discharge device 25, the cathode 25a of discharge device 25 is preferably connected to a source of voltage which is negative with respect to the cathodes of discharge devices 40 and therefore negative with respect to the connection 36. This may be obtained, for instance, by connecting the cathode 25a of device 25 to the midconnection of two series-connected resistors 60 and 61 which form a voltage divider between input connections 14 and 19 which are respectively at ground potential and at minus 50 volts. By this means the device 25 may be operated by a voltage at resistor 35 appearing at connection 37 which is too low to operate devices 40 in the unactuated detector units.

In Fig. 3 there is shown a further modification of the signal bell unit wherein the voltage divider resistors 60 and 61 are not employed, but the cathode 25a of device 25 is connected directly to ground connection 14. In order to avoid false operation of otherwise unactuated alley detector units, a separate discharge device 25 is employed in the signal bell unit for each alley detector unit. This modification is useful for small installations, as for only one or two bowling alleys, where the cost of additional devices 25 does not exceed the cost of the signal bell unit timing capacitor 26 employed in the embodiment of Fig. 1.

The operation of the signal bell units in all of the embodiments shown, whereby a signal appears at a resistor 35 in response to operation of one of the alley detector units, may be described in the following terms. The power supply unit 1 provides power through the signal bell unit to the alley detector units 3. When any one of the alley detector units becomes operative, the greater current flow between the power supply unit and the operative alley detector unit creates a signal in the resistor 35, which is employed in the signal bell unit to operate the signal bell. It will be seen that operation of any alley detector unit will create a signal at resistor 35 to actuate the signal bell unit 2.

Although for convenience and clarity in presentation, the apparatus of this invention has been described in terms of a power supply unit, a signal bell unit, and various alley detector units, It will be understood that the apparatus will often be most conveniently combined as a single unit in a single enclosure. In this connection certain economies may be effected by employed dual purpose electron discharge devices, and housing certain pairs of the discharge devices described above within a common envelope. For instance, devices 15 and 25 may be in a common envelope, as well as devices 40 and 42. It is therefore apparent that only one dual purpose discharge device is required for each additional alley detector unit which may be added to the equipment. In the combination of the discharge devices of the alley detector units into common envelopes a more satisfactory selection of device types is obtainable, however, if the device 42 is combined with the device 42 in an adjacent alley detector unit and device 40 is likewise combined with device 40 in an adjacent detector unit. Detector units are therefore more conveniently added in pairs.

Referring again to Fig. 1, the filament heater elements 55, 56 and 57 of discharge devices 25, 42 and 40 are supplied, as indicated by the letters FF, by the filament transformer secondary winding 58 on power transformer 6. This filament supply winding 58, instead of being grounded, is connected by a conductor 59 to the mid tap of resistors 17 and 18. By reason of this connection no interference is occasioned with the cathode follower operation of discharge device 42, whereas with the filament connected directly to ground, the resistance between the filament heaters 56 and the associated cathodes 42a provides a resistance path for the cathode to ground, which interferes with the cathode follower response desired.

It is to be seen that the timing circuits of this apparatus, including the timing capacitors 26, 41 and 53 provide time delay periods which are relatively independent of both the general level of illumination and the voltage supplied to the phototube as long as phototube operation is satisfactory to initially actuate the detector unit. Being relatively uncritical in adjustment and operation, the apparatus may be easily installed to give a long life of trouble-free operation, while at the same time being simple in structure and therefore economical to manufacture. It is therefore apparent that this invention provides an improved, reliable, durable and economical photoelectric detection apparatus which is very suitable for use as a bowling alley foul detector.

While certain specific embodiments have been shown and described, it will be understood that various modifications may be made without departing from the invention. The appended claims are therefore intended to cover any such modifications within the true spirit and scope of the invention.

What I claim as new and desire to secure by Letters Patent of the United States, is:

1. A relay control system comprising a pair of voltage supply conductors, a first electric valve having an anode, a cathode and a control electrode, a connection from said anode to one of said supply conductors, a connection from said cathode to the other of said supply conductors, means for producing a beam of light, a control circuit including an impedance and a photoelectric cell responsive to an interruption of said beam for producing a change in the voltage across said impedance, an electric valve amplifier connected to be responsive to the voltage across said impedance and connected to said control electrode and cathode for supplying a corresponding changed voltage thereto to initiate a current in the anode-cathode circuit of said valve, an electromagnetic switching device having main load controlling contacts and an operating coil connected in said first connection and responsive to a predetermined value of current in said anode-cathode circuit for picking up said switching device, and means for delaying the pick up of said switching device for a predetermined interval of time after the interruption of said light beam comprising a resistor connected in circuit with said control electrode and a capacitor connected between said anode and said control electrode for controlling the rate of increase of current in said anode-cathode circuit.

2. A relay control system comprising a pair of voltage supply conductors, a first electric valve having an anode, a cathode and a control electrode, connection from said anode to a first of said supply conductors, a connection from said cathode to the other of said supply conductors, a source of light, a control circuit including an impedance and a photoelectric cell responsive to a change in the amount of said light for producing a corresponding change in the voltage across said impedance, an electric valve amplifier responsive to said change in voltage for supplying a corresponding change in voltage between said control electrode and cathode to vary the current in the anode-cathode circuit of said first electric valve, an electromagnetic switching device having main load controlling contacts and having an operating coil connected in said anode connection and responsive to a predetermined value of current in said anode-cathode circuit for picking up said switching device, means for providing a predetermined time interval between the occurrence of said change in light and the pick up of said switching device comprising a resistor included in circuit with said control electrode and a capacitor connected between said anode and said control electrode, a time delay circuit comprising a resistor and a capacitor connected in series to said control electrode and to said second supply conductor, auxiliary normally closed contacts on said switching device normally completing a short-circuit around said last mentioned resistor and capacitor and opened in the picked up position of said switching device to interrupt said short-circuit and to interrupt the supply of voltage from said amplifier to said control electrode, and normally open contacts on said switching device closed in the picked up position of said switching device to complete the connection of said control electrode through said last mentioned capacitor and resistor to said first supply conductor to maintain said switching device picked up for a predetermined interval of time.

3. A control system comprising in combination, a pair of voltage supply conductors, an electric valve having an anode, a cathode and a control electrode and having its anode connected to the first of said conductors and its cathode connected to the second of said conductors, a first resistor included in the connection between said cathode and said second conductor, means for biasing said valve in the region of cut off comprising a circuit including a photoelectric cell and a second resistor connected in series relationship and connections from said second resistor to the control electrode cathode circuit of said valve, a second electric valve having a control electrode, an anode connected to said first conductor, a cathode connected to an intermediate voltage point between said first and second conductors, connections from said first resistor to the cathode and control electrode of said second valve, an electromagnetic switching device having an operating coil in the connection between the anode of said second valve and said first supply conductor and having normally closed contacts in said connections, and means providing a time delay between the response of said photoelectric cell to a light change and the pick up operation of said switching device comprise a resistor connected between the cathode of said first valve and the control electrode of said second valve and a capacitor connected between the anode of said second valve and the control electrode of said second valve.

4. A relay control system comprising in combination, a source of light, a control circuit including an impedance and a photoelectric cell connected in circuit therewith and responsive to a change in the amount of light received from said source for producing a corresponding change in the voltage across said impedance, an electric valve amplifier having output terminals and having an input circuit connected to said impedance device and responsive to changes in voltage across said impedance device for producing corresponding changes in the voltage across said output terminals, a pair of supply conductors, an electric valve having an anode, a cathode and a control electrode and having its anode-cathode circuit connected across said supply conductors, connections from said output terminals to said control electrode and cathode to effect variations in the current in said anode-cathode circuit in response to said light changes, an electromagnetic switching device having contacts for controlling the connections from said output circuit to said control electrode and cathode and having an operating coil connected between said anode and one of said supply conductors and responsive to a predetermined value of current in said anode-cathode circuit for actuating said contacts to interrupt the supply of control voltage to said cathode and control electrode and means for delaying the operation of said relay for a predetermined interval of time after said variation in light comprising a resistor connected between one of said output terminals and said control electrode and a capacitor connected between said anode and said control electrode.

5. A relay control system comprising a pair of voltage supply conductors, a first electric valve having an anode, a cathode and a control electrode, a connection from said anode to a first of said supply conductors, a connection from said cathode to the other of said supply conductors, a source of light, a control circuit including an impedance and a photoelectric cell responsive to a change in the amount of said light for producing a corresponding change in the voltage across said impedance, an electric valve amplifier responsive to said change in voltage for supplying a corresponding change in voltage between said control electrode and cathode to vary the current in the anode-cathode circuit of said first electric valve, an electromagnetic switching device having main load controlling contacts and an operating coil connected in said anode connection and responsive to a predetermined value of current in said anode-cathode circuit for picking up said switching device, means for providing a predetermined time interval between the occurence of said change in light and the pick up of said switching device comprising a resistor included in circuit with said control electrode and a capacitor connected between said anode and said control electrode, and auxiliary normally closed contacts on said switching device opened in the picked up position of said switching device for interrupting the supply of voltage from said amplifier to said control electrode.

ERNEST JELLINEK.

REFERENCES CITED

The following references are of record in the file of this patent:

UNITED STATES PATENTS

| Number | Name | Date |
|---|---|---|
| 2,044,164 | Gulickson | June 16, 1936 |
| 2,060,500 | Hitchcock | Nov. 10, 1936 |
| 2,112,228 | Crago | Mar. 29, 1938 |
| 2,425,257 | MacLagan et al. | Aug. 5, 1947 |
| 2,455,909 | Smith | Dec. 7, 1948 |